G. L. RICHARDS.
STRIP FEEDING AND CUTTING MECHANISM.
APPLICATION FILED FEB. 13, 1917.
1,260,055.
Patented Mar. 19, 1918.
2 SHEETS—SHEET 1.
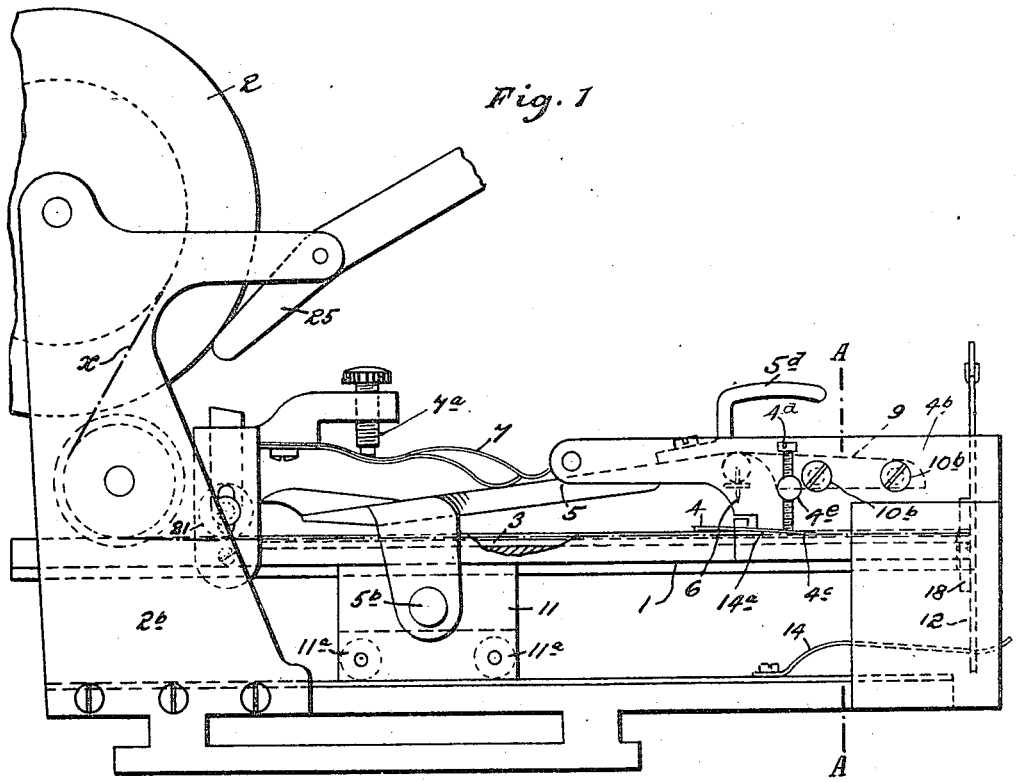
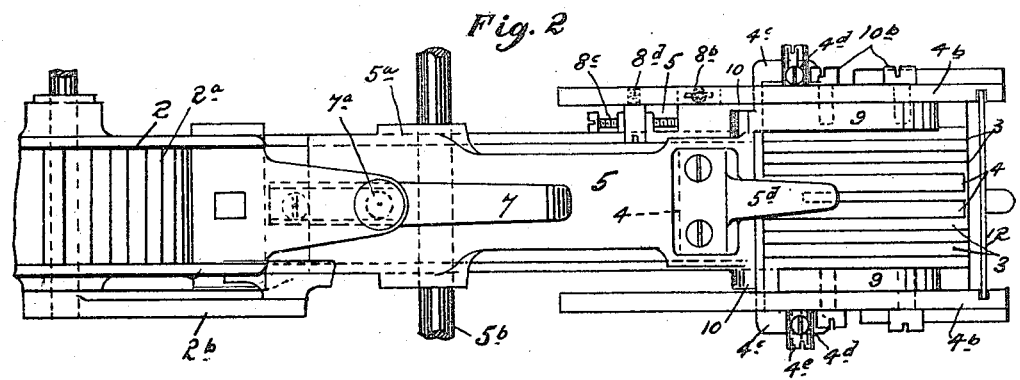
Inventor
Geo. L. Richards
By his Attorney

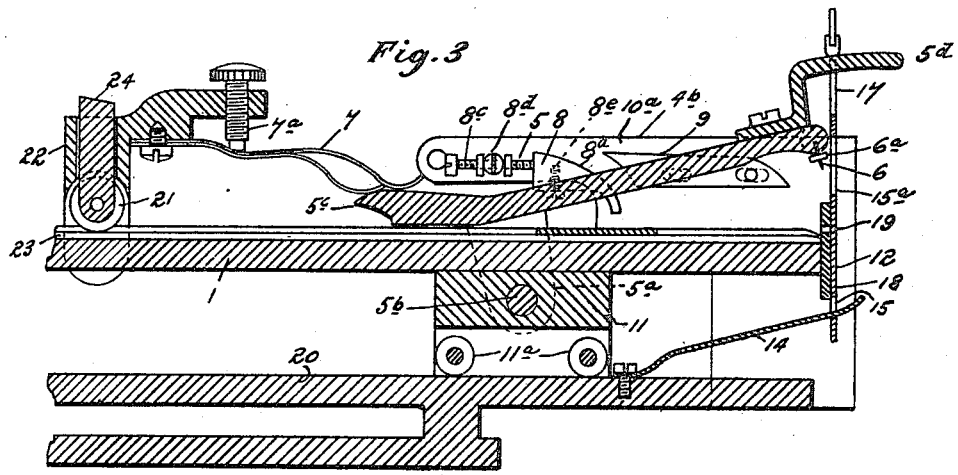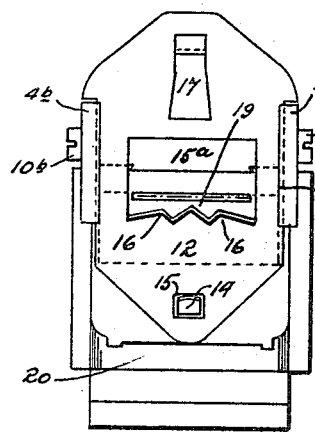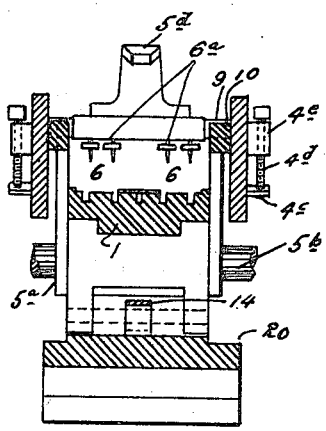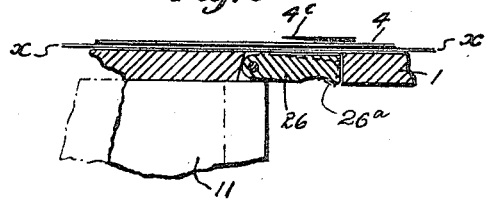

UNITED STATES PATENT OFFICE.

GEORGE LIVINGSTON RICHARDS, OF LONDON, ENGLAND.

STRIP FEEDING AND CUTTING MECHANISM.

1,260,055.      Specification of Letters Patent.      Patented Mar. 19, 1918.

Application filed February 13, 1917. Serial No. 148,458.

*To all whom it may concern:*

Be it known that I, GEORGE LIVINGSTON RICHARDS, a citizen of the United States of America, residing in London, England, have invented certain new and useful Improvements in Strip Feeding and Cutting Mechanism, of which the following is a specification.

This invention relates to strip feeding and cutting mechanism more particularly applicable to vending machines for delivering postage stamps, tickets and the like and comprises improvements in or modifications of the invention disclosed in the specification of my prior Letters Patent No. 1114912 dated 27th October 1914 for the purpose of producing a more simple and efficient machine.

In the aforesaid specification there is described a table on which the strip to be fed is placed, there being a pivoted reciprocating feed-arm at one side of said table provided with sharp teeth or equivalents adapted to engage the perforations or joints in the strip to feed the latter and at the other side of said table an arm having a severing member adapted, when the feed arm has reached the end of the table, to coact with said teeth on the feed arm to sever the strip exactly at the perforations or joints and thus detach a portion from the strip.

Now, according to the present invention, I provide a construction in which the second mentioned arm is dispensed with, and wherein I do not depend on the teeth on the feed-arm engaging the perforations or joints in the strip, but the said teeth may engage the strip at any appropriate point of the strip depending on the length of feed desired, and again the cutting member is in the form of a reciprocating knife movable at right angles to the path of the strip and actuated positively by the feed arm when the end of the latter is raised at the termination of its feeding stroke prior to returning to its original position for a new feed movement.

The invention is represented in the accompanying drawings in which Figure 1 is a side elevation of the improved machine. Fig. 2 is a plan view thereof. Fig. 3 a partial longitudinal section with parts in a different position to Figs. 1 and 2. Fig. 4 an elevation from the right hand end of Fig. 1, Fig. 5 a section on the line A—A of Fig. 1 and Fig. 6 a detail view of a part hereinafter described.

The machine comprises a stationary plate or table 1 upon which the strip of stamps, tickets or the like $x$ or portion thereof taken from a storage reel 2 and passed about a guide roll $2^a$ is laid in a predetermined position, the reel 2 being shown as mounted on a bracket $2^b$ extending from the base plate 20 of the machine. The table is longitudinally grooved as at 3 either throughout or for a portion of its length and above said table 1 is disposed a flat slotted spring-member 4 mounted in slots not shown in lateral plates $4^b$ extending upward at each side of the table, the spring member being provided with extensions $4^c$ acted upon by set-screws $4^d$ traversing bosses $4^e$ on the plates $4^b$ in order that its pressure on the strip may be adjusted, said strip being inserted between the table 1 and the spring-member so that the latter bears lightly on the strip to maintain same in intimate contact with the table.

Above the said table 1 is disposed a reciprocating arm 5 carried by arms $5^a$ pivoted on a shaft $5^b$ mounted in a slide block 11, provided with rollers $11^a$ bearing on the base plate 20 and adapted to be reciprocated on said base plate by suitable means (not shown) applied to one or both projecting ends of the shaft $5^b$. The arm 5 is provided at its forward end with a plurality of sharp pins or teeth 6 projecting downwardly therefrom and preferably surrounded with pads or washers of rubber $6^a$ or other resilient material, the said teeth coinciding in position with the grooves 3 in table 1 and being adapted to extend through slots in the aforesaid spring member 4 to engage the strip during the feeding movement, at which time the rubber washers $6^a$ bear resiliently on the strip.

The arm 5 is normally pressed toward the strip by a double spring 7, the pressure of which is adjustable, by a set screw $7^a$ and is guided by cam-members 8, 9 on the plates $4^b$ as follows: The forward end of the arm is provided with laterally extending circular bosses 10 and during the forward reciprocation of the arm said bosses slide down the curved face $8^a$ (Fig. 3) of the cam-member 8 thus permitting the pins 6 to engage and penetrate the strip under the action of the spring 7 acting on the arm 5, the strip having been primarily adjusted so that the point at which it is to be severed (such as the usual perforations between successive stamps) coincides with the end of the table.

The arm 5 and strip are now reciprocated forward under the cam-member 9 until the spring 7 bears upon a tail piece 5ᶜ at the rear of the arm 5, whereupon said arm will be rocked about the shaft 5ᵇ into the position shown in Fig. 3, thus disengaging the pins 6 from the strip. The detachment of the strip portion thus fed forward now takes place and this is effected by the knife 12 mounted for vertical movement in grooves 13 in the side plates 4ᵇ and under the action of a spring 14 engaging a slot 15 therein to normally retain the knife in its depressed position. The said knife is slotted at 15ᵃ for passage of the strip and the lower edge of the slot is provided with cutting edges 16 preferably of the zig-zag shape shown in Fig. 4 and is raised into active position by a nose 5ᵈ on the arm 5 engaging a further slot 17 in the knife so that as the forward end of the arm 5 is raised under the action of the spring 7 which is more powerful than the spring 14, the knife will shear the strip against a fixed plate 18 at the end of the table provided with a slot 19 for passage of the strip. At the moment of severance of the stamps by the knife 12 pressure is exerted against the underside of the strip to force same against the spring 4 by means of a tongue or latch 26 (Fig. 6) pivoted in a slot in the table 1 and having an inclined surface 26ᵃ (Fig. 6) against which the forward edge of the slide-block 11 abuts and thus forces it upward, the tongue returning to normal position by gravity when freed from the block 11. Any movement of the strip at the moment of cutting is thus prevented.

On return movement of the arm 5, the bosses 10 on the latter will travel along the upper surfaces of the cam-members 9, of which one is shown at each side of the table, and when the rear end of the same cam-members has been reached the bosses 10 on the arm 5 will drop down the path 10ᵃ provided between one of them and the cam-member 8, and the pins 6 will thus again penetrate the strip to feed same for a further distance on the arm being again reciprocated forward. Simultaneously with the rearward movement of arm 5 the nose 5ᵈ thereon will be removed from the slot 17 in the knife 12 permitting the same to be restored to normal position by its spring 14. The point at which the pins 6 of the feed arm 5 are permitted to enter the strip is controlled by the position of the cam-member 8 and this position may be adjusted by mounting same in a slot 8ᵇ in one of the side plates 4ᵇ, adjustment being effected by a screw 8ᶜ traversing an abutment 8ᵈ extending from the plate and bearing on the end of the cam-member, the latter being held in its adjusted position by a screw 8ᵉ. The cam-members 9 may also be adjustably carried in the plates 4ᵇ by mounting same thereon by means of screws 10ᵇ traversing slots 10ᶜ in the cam-members so that the path 10ᵃ may remain of the same width for reception of the arm bosses 10. By these means the effective or feeding stroke of the arm may be varied to feed different strip lengths as desired.

A roller 21 mounted to slide vertically in bearings 22 normally bears on the strip but drops into a recess 23 in the table when the last portion of the strip has passed from under said roller. The latter coöperates with a rod 24 which normally engages a lever 25 carried by the bracket 2ᵇ, consequently when said roller drops the lever 25 is released and through suitable devices (not shown) actuates means by which the coin aperture (where such is provided) is closed in a manner which will be readily understood.

What I claim as my invention and desire to secure by Letters Patent of the United States is:—

1. In strip feeding and cutting mechanism, the combination with a fixed support over which the strip to be cut travels, of a strip feeding member on one side of said table adapted to swing toward and from the same to engage the strip and to move longitudinally of the support to advance the strip thereover, a cutting element disposed for movement at the end of said support, and means whereby said feeding member is caused to positively actuate said cutting element to detach a portion from said strip.

2. In strip feeding and cutting mechanism, the combination with a fixed support over which the strip to be cut travels, of a strip feeding member on one side of said support adapted to swing toward and from the same to engage said strip and to move it longitudinally of the support for a definite distance, projecting members on said feeding member to positively engage said strip, a cutting element at the end of said support disposed for movement rectangularly thereto, and means on said feeding member adapted to engage the cutting element and positively actuate same to detach a portion from said strip as said feeding member swings away from the support.

3. In strip feeding and cutting mechanism, the combination of a support to receive a strip to be fed, a pivoted reciprocatory feed member on one side of said support having a means at its forward edge to engage and feed said strip along said support, a rectilinearly movable cutting element at one end of said support and means whereby said cutting element is positively actuated by said feeding member at the end of the feeding movement to sever a portion from said strip.

4. In strip feeding and cutting mechanism, the combination of a support to receive a strip to be fed, a feed member at one side of said support adapted to engage and convey the strip along same, a rectilinearly movable cutting element at one end of said support, means whereby said cutting element is positively actuated by said feeding member at the end of the feeding movement to detach a portion from said strip, and means for positively determining the point of the strip at which the feeding member shall engage said strip to convey same.

5. In strip feeding and cutting mechanism, the combination of a support to receive a strip to be fed, a pivoted reciprocatory member on one side of said support having a plurality of pins at its forward edge to engage and feed said strip along said support, resilient means adapted to exert pressure to hold the strip against said support, a rectilinearly movable cutting element at one end of said support and means whereby said cutting element is positively actuated by said feeding member at the end of the feeding movement to detach a portion from said strip.

6. In strip feeding and cutting mechanism, the combination with a fixed table over which the strip to be cut travels, of a strip feeding member on one side of said table adapted to swing toward and from the same to engage said strip and move it longitudinally of the table for a definite distance, projecting members on said feed member to positively engage said strip, an adjustable spring member adapted to bear on said strip and provided with a slot for passage of the projecting members aforesaid, adjustable means for determining the point of engagement of said projecting members with the strip, a cutting element at the end of said table disposed for movement rectangularly thereto, and means whereby said feeding member is caused to positively actuate said cutting element to detach a portion of said strip.

7. In strip feeding and cutting mechanism the combination with a fixed table over which the strip to be cut travels, of a strip feeding member on one side of said table adapted to swing toward and from the same to engage the strip and to move longitudinally of the table to advance the strip thereover, a cutting element disposed for movement at the end of said table, means whereby said feeding member is caused to positively actuate said cutting element to detach a portion from said strip, a spring normally retaining said cutting element in normal position, and a second spring acting on said feeding member and adapted at the end of the feeding movement thereof to overcome said first mentioned spring and swing the feeding member to actuate the cutting element.

8. In strip feeding and cutting mechanism, the combination of a support to receive a strip to be fed, a pivoted reciprocatory feed member on one side of said support having a means at its forward edge to engage and feed said strip along said support, a rectilinearly movable cutting element at one end of said support, means whereby said cutting element is positively actuated by said feeding member at the end of the feeding movement to sever a portion from said strip and a tongue or latch pivoted to the support and adapted on the feed movement of the feed member to press on the underside of the strip and hold it in position at the moment of severance.

In witness whereof I have signed this specification in the presence of two witnesses.

GEORGE LIVINGSTON RICHARDS.

Witnesses:
GEORGE W. MITCHELL,
C. BLUMSOM.